No. 703,029. Patented June 24, 1902.
F. A. WILSKE.
BICYCLE REPAIR SPOKE.
(Application filed Dec. 31, 1901.)

(No Model.)

Witnesses
Elmer Seavey
James R. Mansfield

Inventor
Frank A. Wilske
By
Alexander & Dowell, Attorneys.

UNITED STATES PATENT OFFICE.

FRANK A. WILSKE, OF CHAMPAIGN, ILLINOIS.

BICYCLE REPAIR-SPOKE.

SPECIFICATION forming part of Letters Patent No. 703,029, dated June 24, 1902.

Application filed December 31, 1901. Serial No. 87,954. (No model.)

*To all whom it may concern:*

Be it known that I, FRANK A. WILSKE, of Champaign, in the county of Champaign and State of Illinois, have invented certain new and useful Improvements in Bicycle Repair-Spokes; and I hereby declare that the following is a full, clear, and exact description thereof, reference being had to the accompanying drawings, which form part of this specification.

This invention is an improvement in bicycles, and has particular reference to the wheels thereof; and its object is to provide a simple "repair-spoke" or spoke which can be readily substituted in the wheel for a broken spoke without having to dismantle the bicycle or detach the wheel or disconnect the sprocket-wheel or sprocket from the wheel if the broken spoke happens to be in the rear wheel.

Bicycle-wheels are ordinarily constructed with flanged metal hubs, metal or wooden rims, and wire spokes connected at one end to the hub-flanges and at the other ends to the rim, and the spokes being commonly headed and bent at one end to engage the perforations of flanges, and threaded at their other ends to engage a flanged nut slipped through a suitable opening in the rim. On the rear wheels of bicycles the sprocket-chains are placed so near the hub-flange that it is impossible to insert a spoke of the ordinary kind without first removing the sprocket-chain and sprocket. This of course is tedious and renders the repairing or replacing of broken spokes quite expensive; but my improved repair-spokes can be applied to such wheels without disconnecting the sprocket or sprocket-chain in a very expeditious manner.

The invention therefore consists in the novel construction of the repair-spoke, as shown in the accompanying drawings and hereinafter described with reference thereto.

Figure 1:
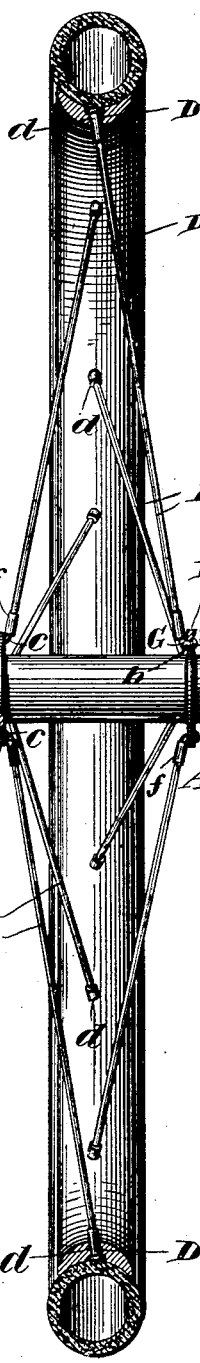
Figure 2:
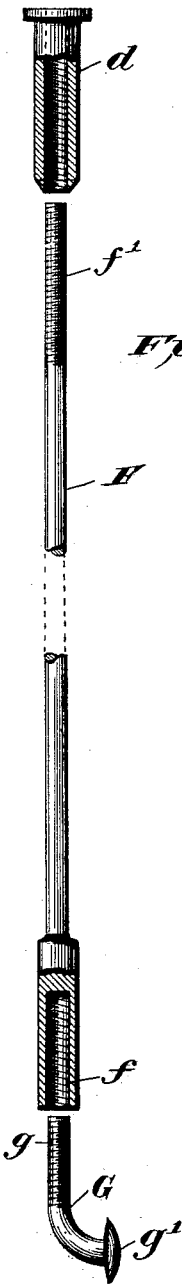

In said drawings, Figure 1 is a detail sectional view of part of a rear wheel of a bicycle with my improved repair-spoke attached thereto. Fig. 2 is an enlarged view of the repair-spoke detached.

A designates the hub of the rear wheel of a bicycle as ordinarily constructed, said hub having a spoke-flange B, provided with transverse perforations $b$ for the engagement of the inner ends of the spokes, which are generally bent at right angles, as shown at $c$, and passed through the perforations of the hub-flange B, as indicated in the drawings.

D designates the wheel-rim or felly, to which the outer ends of the spokes are attached.

E designates a sprocket secured to the end of hub A close to flange B, over which sprocket the usual driving-chain (not shown) is passed. It will be observed that by reason of the proximity of the sprocket E to the spoke-flange B ordinary spokes cannot be connected to the flange B unless the sprocket F is removed, and if the wheel is in position on the bicycle of course the sprocket-chain would also have to be removed; but by using my improved repair-spokes the necessity for detaching sprocket E is avoided.

My repair-spoke, as shown, comprises the main spoke member or rod portion F, having an internally-threaded socket $f$ on its inner end, while its outer end is exteriorly threaded, as at $f'$. The socket $f$ is adapted to engage the threaded end $g$ of a flange-engaging spoke member G, which is bent substantially at right angles or into L shape and has its plain end headed, as at $g'$, so that when the threaded end of the member G is slipped through one of the perforations $b$ of the spoke-flange B the head $g'$ will abut against the flange, as shown in Fig. 1, and when rod F is turned, so as to engage socket $f$ with end $g$ of member G, the spoke is securely attached to the flange B. The outer end $f'$ of the rod F may be engaged by a tubular flanged nut $d$, slipped through an opening D' in the rim D in the usual manner. The threads of socket $f$ and end $f'$ may be so formed that by properly rotating rod F it may be similarly engaged with parts G and $d$, and thus rapidly tautened.

By having the repair-spokes in sections, as described, the piece G may be readily slipped into position through one of the perforations in the hub-flange B without disturbing the sprocket wheel or chain, (although it would be impossible to slip an ordinary spoke into position without removing said sprocket and chain,) the piece G being short enough to be inserted from either side of the flange. After this piece is inserted rod F is screwed thereto, and its outer end is fastened to the rim either by the tubular nut shown or in any other suitable manner. The time ordinarily required for removing the sprocket wheel and chain and for replacing them when repairing spokes is thus saved by the use of my improved repair-spoke, and the replacing of broken spokes is rendered a very simple and easy matter.

Having thus described my invention, what I therefore claim as new, and desire to secure by Letters Patents thereon, is—

The combination in a bicycle, of the wheel having a perforated spoke-retaining flange on its hub, and a rim; with a repair-spoke comprising a curved member adapted to be slipped through the perforation of the hub-flange, and a rod portion having a threaded socket on one end adapted to engage the threaded end of the flange-engaging member, and a tubular nut attached to the rim adapted to engage the outer threaded end of the rod, all substantially as and for the purpose set forth.

In testimony that I claim the foregoing as my own I affix my signature in presence of two witnesses.

FRANK A. WILSKE.

In presence of—
GEO. W. DAVIDSON,
BEN L. ASPERN.